United States Patent
Charpentier et al.

(10) Patent No.: US 10,957,014 B1
(45) Date of Patent: Mar. 23, 2021

(54) APPARATUS, SYSTEM AND METHOD FOR LABELING TILES FOR A MOSAIC IMAGE

(71) Applicant: Picture Mosaics LLC, Blue Bell, PA (US)

(72) Inventors: Albert Joseph Charpentier, Phoenixville, PA (US); Joseph Walter Charpentier, Schwenksville, PA (US)

(73) Assignee: Picture Mosaics LLC, Blue Bell, PA (US)

( * ) Notice: Subject to any disclaimer, the term of this patent is extended or adjusted under 35 U.S.C. 154(b) by 440 days.

(21) Appl. No.: 15/933,957

(22) Filed: Mar. 23, 2018

Related U.S. Application Data

(60) Provisional application No. 62/481,791, filed on Apr. 5, 2017.

(51) Int. Cl.
  *G06T 3/40* (2006.01)
  *G06T 7/11* (2017.01)
  *B41J 3/38* (2006.01)

(52) U.S. Cl.
  CPC ............... *G06T 3/4038* (2013.01); *B41J 3/38* (2013.01); *G06T 7/11* (2017.01); *G06T 2207/20021* (2013.01); *G06T 2207/20132* (2013.01)

(58) Field of Classification Search
  CPC ..... B41J 3/38; B44C 1/28; B44C 3/12; B44C 3/123; B44C 3/126; G06T 2200/32; G06T 2207/20021; G06T 2207/20132; G06T 3/4038; G06T 7/11
  See application file for complete search history.

(56) References Cited

U.S. PATENT DOCUMENTS

| | | | |
|---|---|---|---|
| 5,234,340 A * | 8/1993 | Hambright | G09B 19/20 434/81 |
| 5,649,032 A | 7/1997 | Burt | |
| 6,137,498 A | 10/2000 | Silvers | |
| 6,532,312 B1 | 3/2003 | Corkran | |
| 7,565,028 B2 | 7/2009 | Saed | |

* cited by examiner

*Primary Examiner* — George R Koch
(74) *Attorney, Agent, or Firm* — Robert J. Yarbrough of Lipton, Weinberger & Husick

(57) ABSTRACT

In a system and method for producing a mosaic image, a printable substrate has a front side that defines a first area and a second area. Both the first and second areas are printable. A back side of the printable substrate features a pressure-sensitive adhesive and a backing. The first area corresponds to a region of a physical matrix of regions. A source image may be printed on the first area to define a tile and an address of the tile on the matrix of regions may be printed on the second area. The tile may be peeled from the backing separately from the second area to reveal the pressure sensitive adhesive. Users may adhere a plurality of tiles to the matrix of regions at the addresses on the second areas to define the mosaic image.

18 Claims, 4 Drawing Sheets

APPARATUS, SYSTEM AND METHOD FOR LABELING TILES FOR A MOSAIC IMAGE

I. STATEMENT OF RELATED APPLICATIONS

This non-provisional patent application is entitled to priority from U.S. Provisional Patent Application 62/481,791 filed Apr. 5, 2017, which application is hereby incorporated by reference as if set forth in full herein.

II. BACKGROUND OF THE INVENTION

A. Field of the Invention

The Invention relates to the labeling of tiles for use in a mosaic image or quilt so that an inexperienced user may accurately and quickly locate and place a physical tile in a physical mosaic image. The Invention is a printable substrate for use in creating a physical mosaic image and is a system for creating a mosaic image using the labeled tiles. The Invention is also a method of creating a mosaic image using the labeled tiles.

B. Description of the Prior Art

As used in this document, an image composed of a large number of smaller images is a 'mosaic image.' Each of the smaller images making up the mosaic image is referred to herein as a 'tile.' The mosaic image is a representation of a 'target image.' Each of the tiles is derived from a 'source image.'

The creation of a mosaic image from smaller source images is known in the art. For example, U.S. Pat. No. 6,137,498 to Silvers issued Oct. 24, 2000 teaches dividing a target image, such as a portrait of Abraham Lincoln, into a multiplicity of regions. Each region is matched to a source image by matching the hue, intensity and contrast of the corresponding region as closely as possible. The source images are cropped to the appropriate size to define tiles. The tiles are assigned to the corresponding region and tiles are knit together electronically to define the mosaic image.

See also U.S. Pat. No. 7,565,028 to Saed, issued Jul. 21, 2009, which teaches that the mosaic image may be composed of a limited number of source images by manipulating the images. The source images may be cropped and the brightness, contrast, and color of the source images adjusted electronically so that the resulting tiles meet the requirements of all of the regions of the mosaic image. Electronically adjusting the source images allows a small number of source images to effectively define a large mosaic image.

The prior art also teaches that tiles may be combined to define the mosaic image manually rather than electronically. In one application, a camera takes a portrait of a person. The resulting portrait is a source image. A computer compares the source image to a matrix of regions of a pre-determined target image. The computer selects one of the regions of the matrix of regions and performs any manipulations required to adequately match the target image to the selected region. A printer prints the resulting tile on paper having a pressure-sensitive adhesive with a peel-off backing. The person who is the subject of the portrait locates the selected region on the physical matrix of regions, peels off the backing and adheres the tile to the selected region using the pressure-sensitive adhesive. The mosaic image emerges over time as more and more tiles are added to the physical matrix of regions.

In this manual application, the matrix coordinates for a tile generally are printed on the front of the tile, along with the portrait or other image. To avoid interfering with the image, the matrix coordinates may be printed in small and difficult-to-read type. In addition, the colors in the image on the tile may interfere with the legibility of the printed matrix coordinates. For example, matrix coordinates printed in white may be appear on a white region of the tile. Furthermore, creating a 'stroke,' or contrasting outline, around the coordinates does not solve the issue of legibility because the tile may have similar colors to the matrix coordinates and stroke, rendering the matrix coordinates and stroke difficult to read against the background of the tile. Selecting contrasting colors for the matrix coordinates to make the matrix coordinates legible on the tile may detract from the completed mosaic image.

The main problem with this manual system is that the persons placing the tiles on the matrix of regions may not adequately see and decipher the matrix coordinates on the face of the tile and may not accurately locate the selected region. The person therefore may misplace the tile or may take significant time, and eyestrain, to determine the matrix coordinates.

III. BRIEF SUMMARY OF THE INVENTION

A printable substrate for use as a tile in a matrix of tiles to define a mosaic image has a front side and a back side. A pressure-sensitive adhesive is disposed on the back side of the printable substrate. A backing having a release layer is releasably attached to the pressure-sensitive adhesive. The backing is peelable to expose the pressure-sensitive adhesive on the printable substrate. The printable substrate and backing may be composed any suitable materials, such papers or polymers.

The front side of the printable substrate defines at least two printable areas; namely, a first area and a second area. Both the first area and the second area are printable. The first area is the size and shape of a region of a physical matrix of regions. When a source image is printed on the first area, the first area will define a tile of the mosaic image.

The first and second areas are separated from one another on the backing so that the first area may be peeled from the backing while leaving the second printable layer in place on the backing.

The second area on the front side of the printable substrate is sized to receive identifying indicia. The identifying indicia will identify the physical address of the region on the physical matrix of regions corresponding to the tile defined by the first area. As used in this document, the term 'physical address' means indicia adequate to identify a specific location of a region on a physical matrix of regions to allow a person to locate the specific region on the physical matrix. The physical address may be the coordinates of the region, such as X-Y coordinates.

As an alternative embodiment, the printer may print the identifying indicia on the backing. For this second embodiment, the printable substrate may dispense with the second area.

The system of the Invention includes a computer configured to receive a target image and to divide the target image into target image regions for the purpose of creating a mosaic image of the target image. The target image regions into which the computer divides the target image correspond to the physical regions of a physical matrix of regions. The computer is configured to determine a physical address on the physical matrix of regions corresponding to each of the target image regions.

The physical matrix of regions is composed of a material to which the pressure sensitive adhesive will adhere, such as a paper or a polymer. For each of the target image regions identified by the computer, the physical matrix includes a physical location for a corresponding physical region. The physical matrix also displays a physical address, such as X-Y coordinates, configured to allow a person observing the physical matrix to identify the location of each of the physical regions of the physical matrix.

The computer is configured to collect source images and to convert those source images into tiles to generate the mosaic image. A camera may be connected to the computer and may be configured to capture source images in the form of, for example, portraits of persons. The computer may receive the source images from the camera. Alternatively, the computer may be configured to receive any image of any nature and from any source as a source image. For example, the computer may be configured for connection to a computer network and to harvest source images from the computer network, such as social media, Twitter, Instagram, Facebook, Snapchat, Photobooth, or any other source of images available on the computer network. The computer is configured to assign each of the source images to one or more of the target image regions. The computer may be configured to manipulate a source image so that the manipulated source image will be suitable as a tile to define the selected region of the mosaic image. The manipulation may take the form of cropping or adjusting the color, contrast or intensity of the source image. The computer may be configured to make any other adjustments appropriate to conform the source image to the requirements of the selected target image region.

The computer is configured to print the manipulated source image to the first area of the printable substrate, as discussed above. Once the manipulated source image is printed to the first area, the first area defines a tile of the mosaic image, ready for installation on the physical matrix. The computer also is configured to print the physical address corresponding to the selected region of the physical matrix on the second area of the printable substrate. The computer is configured to print the physical address in a manner so that a person can readily perceive the printed physical address, as by selecting font of an adequate size, color and weight so that if the physical address were to be printed on the tile, then the physical address would interfere with the resulting mosaic image.

A human user may then physically handle the printable substrate, identify the physical address printed on the second area, identify the corresponding region of the physical matrix, peel the tile from the backing and attach the tile onto the identified region of the physical matrix using the exposed pressure sensitive adhesive.

The method of the invention comprises selecting a target image and providing the target image to a computer. The computer performs the steps of dividing the target image into target image regions and assigning each of the target image regions to corresponding regions of a physical matrix of regions, as discussed above.

The source image collection step may include capturing a portrait of a person or other image using a camera and providing the resulting image to the computer as a source image. Alternatively, in the source image collection step, the computer harvests any image from any source as the source image, such as a network-enabled computer collecting a source image from the Internet. The computer selects a target image region to which the source image and resulting tile will correspond. The method may include a manipulation step of the computer manipulating the source image, as by cropping or adjusting the color, contrast or intensity. The printing step comprises the computer printing the source image on the first area of the printable substrate to define the tile and printing the physical address for the tile on the second area.

The placement step includes providing the human user with the printable substrate, including the tile defined by the first area and the physical address printed on the second area. The human user will perform the steps of identifying the address on the matrix, peeling the tile from the backing, and attaching the tile to the physical matrix at the specified address using the pressure sensitive adhesive. As multiple persons attach their tiles to the matrix, the mosaic image will become visible.

IV. BRIEF SUMMARY OF THE DRAWINGS

V. DESCRIPTION OF AN EMBODIMENT

Figure 1:
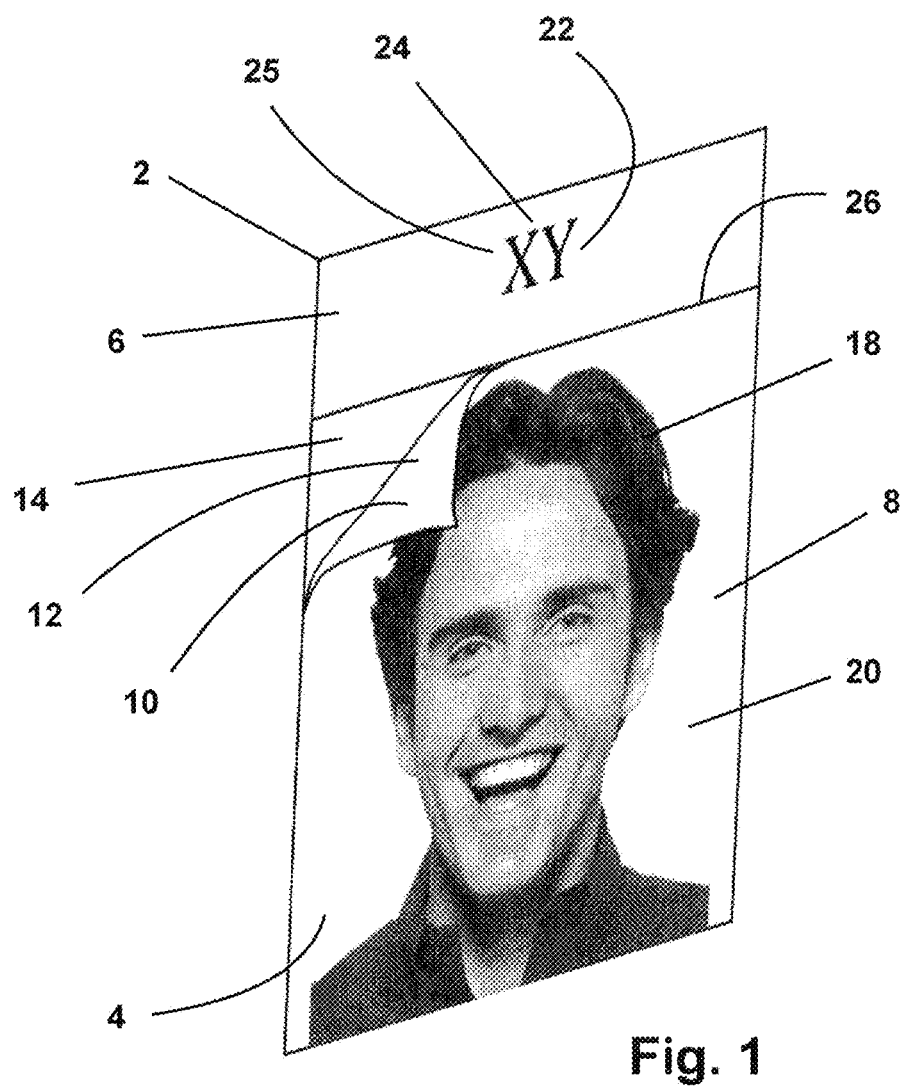
FIG. 1 is a perspective view of a printable substrate showing the first and second areas with a printed image and address.
Figure 2:
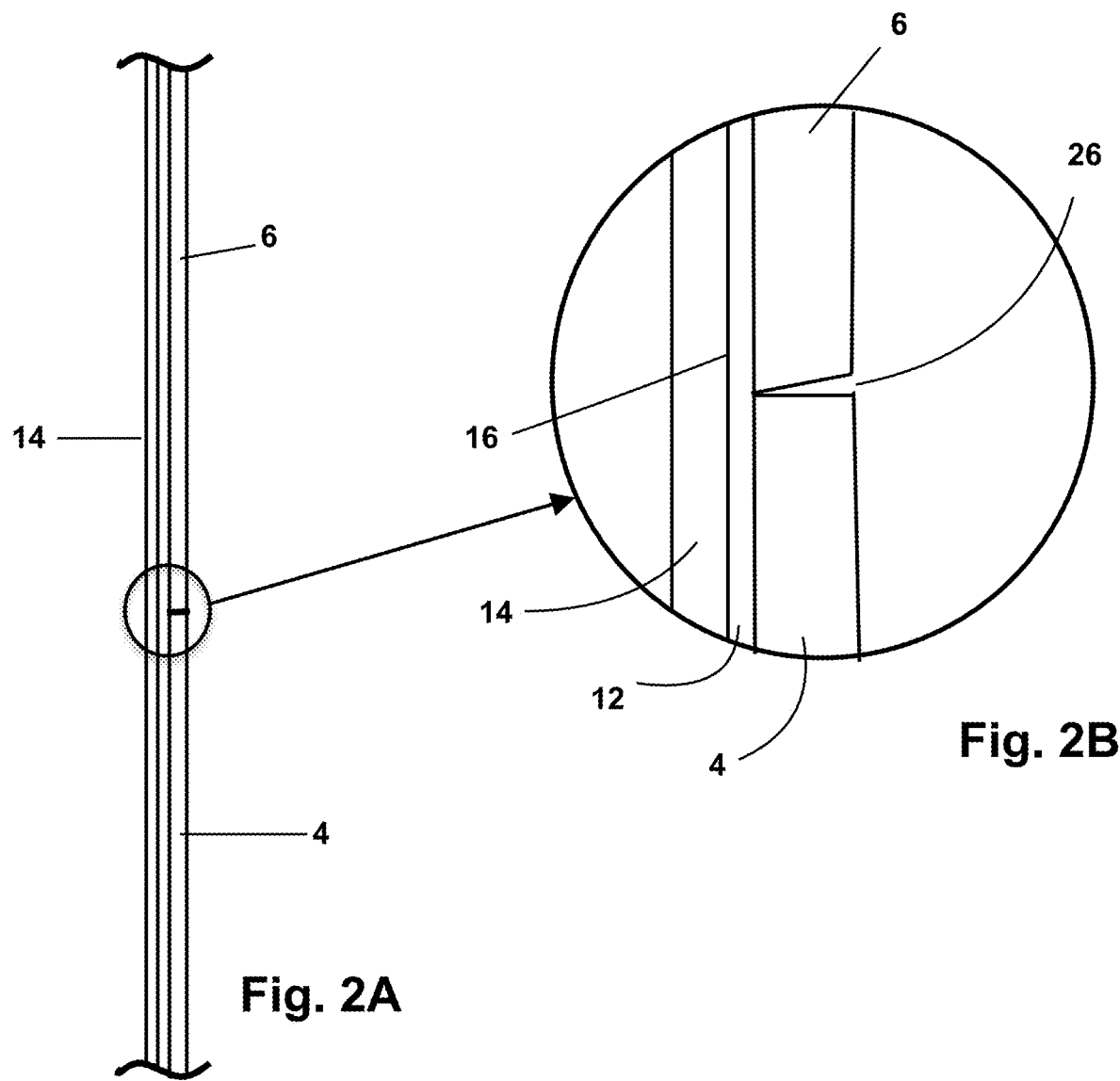
FIG. 2A is a side view of a printable substrate
FIG. 2B is a detail side view of the printable substrate.

FIGS. 1, 2A and 2B illustrate the printable substrate 2 of the invention.

FIGS. 2A and 2B are side views showing the construction of the printable substrate 2. FIG. 2B is a magnified detail of the indicated location on FIG. 2A.

From FIG. 1, the printable substrate 2 defines a first area 4 and a second area 6. The first and second areas 4, 6 are separated one from the other. The first area 4 has a front side 8 and a back side 10. The front side 8 of the first area 4 is printable so that a source image 18 may be printed on the first area 4. Once the source image 18 is printed to the first area 4, the first area 4 becomes a tile 20 to define one region 30 of a mosaic image 40, as described below.

The second area 6 is configured to receive a physical address 24 printed on the second area 6. The physical address 24 comprises indicia 22 adequate to locate the tile 20 on a physical matrix of regions 32 and hence to locate the tile 20 within the mosaic image 40. The physical address 24 may be, for example, X-Y coordinates 25, as described below.

The back side 10 of the first and second areas 4, 6 is coated with a pressure-sensitive adhesive 12. A backing 14 has a release layer 16 disposed between the backing 14 and the pressure-sensitive adhesive 12. The first and second areas 4, 6 are divided by a cut 26. The cut 26 does not extend through the backing 14. The presence of the cut 26 and of the release layer 16 on the backing 14 allows the first area 4 to be selectably peeled from the backing 14 while leaving the second area 6 in place on the backing 14, as shown by FIG. 1. FIG. 1 shows the first area 4 partially peeled from the backing 14 while the second area 6 remains in place on the backing 14.

Figure 3:
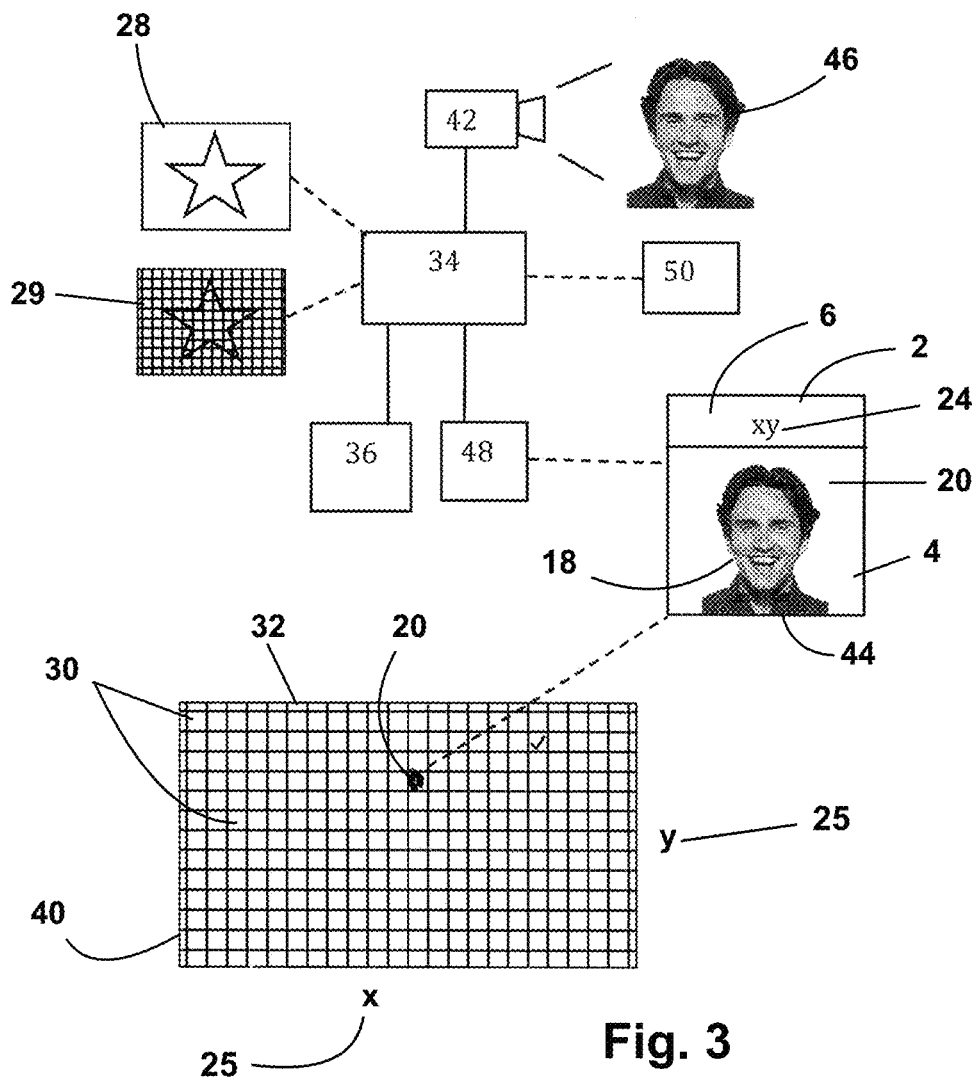
FIG. 3 is a schematic diagram of the system of the Invention.

FIG. 3 illustrates the system of the Invention utilizing the printable substrate 2. A target image 28 is provided to a computer 34 and loaded into computer memory 36. The target image 28 may be any suitable image, such as logo. In the example of FIG. 3, the target image 28 is a five-pointed star. The computer 34 divides the target image 28 into a plurality of target image regions 29. Each of the target image regions 29 corresponds to a region 30 on a physical matrix of regions 32. Each of the regions 30 on the physical matrix of regions 32 has a physical address 24. In the example of FIG. 3, the physical address 24 comprises X-Y coordinates 25. The physical address 24 may be any other addressing system that sufficiently identifies a region 30 of the physical matrix of regions 32. The matrix of regions 32 is a physical object and will define the mosaic image 40 when completed. The physical matrix of regions 32 is composed of a material to which the pressure-sensitive adhesive 12 will adhere, such as paper or a polymer.

A camera 42 collects a source image 18 and provides the source image 18 to the computer 34 and to computer memory 36. Alternatively, the source image 18 may be provided to the computer 34 from any other source. For example, the computer 34 may be network-enabled and the computer may be configured to harvest the source image 18 from a computer network 50, such as images on social media, Twitter, Instagram, Facebook, Snapchat, Photobooth or any other image source. The source image 18 may be a portrait 44 of a person 46 or any other image. The computer 34 accesses the source image 18 and selects a target image region 29 to which the source image 18 will correspond. The computer 34 then may manipulate the source image 18, as by cropping the source image 18 or by adjusting the color, intensity or contrast, so that the manipulated source image 18 will better match the color, intensity or contrast of the corresponding target image region 29 of the target image 28.

The computer 34 causes a printer 48 to print the manipulated source image 18 to the first area 4 of the printable substrate 2. The first area 4 is now a tile 20 and ready to contribute to the overall mosaic image 40. The computer 34 causes the printer 48 to print the physical address 24 assigned to the source image 18 on the second area 6 of the printable substrate 2. The physical address 24 identifies the region 30 of the matrix of regions 32 to which the tile 20 corresponds. The physical address 24 may take the form of X-Y coordinates 25, as shown by FIG. 3. The physical address 24 also my take any other form suitable to identify the location of the selected region 30 in the physical matrix of regions 32.

A person 46, who may be the same person 46 whose portrait 44 or other relevant image was collected by the camera 42 or from a computer network 50, is provided the printable substrate 2, including the tile 20 and physical address 24. The person 46 is instructed to locate the physical address 24 on the physical matrix of regions 32 and to peel the tile 20 from the backing 14, thus exposing the pressure-sensitive adhesive 12 on the back side 10 of the tile 20. The person 46 is instructed to adhere the tile 20 to the region 30 identified by the address 24 using the pressure-sensitive adhesive 12. As multiple persons 46 adhere tiles 20 to the matrix of regions 32, the mosaic image 40 appears.

Figure 4:
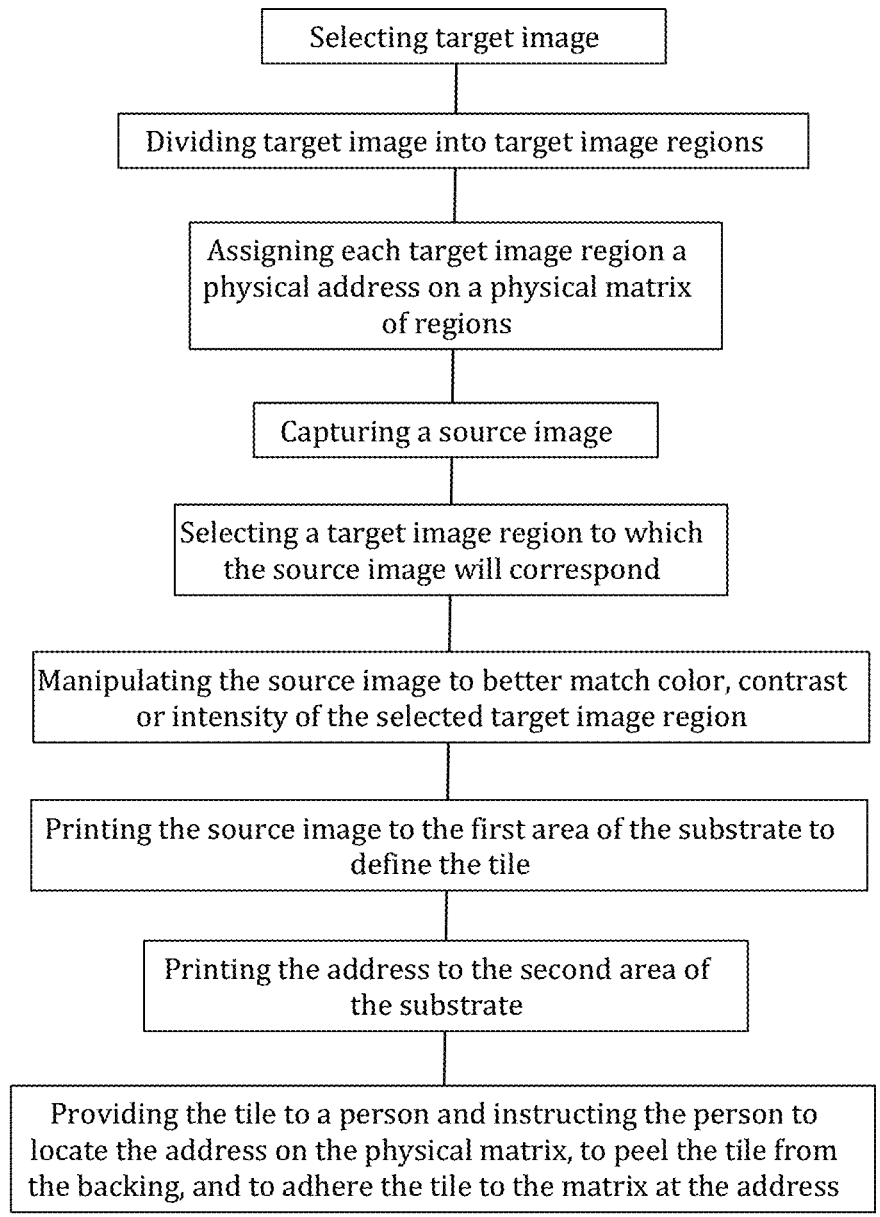
FIG. 4 is a flowchart of a method of the Invention.

FIG. 4 is a flowchart of the method of the Invention utilizing the printable substrate 2. The first steps are selecting a target image 28, dividing a target image 28 into a plurality of target image regions 29 and assigning each target image region 29 a physical address 24 of a physical region 30 on a physical matrix of regions 32. A computer 34 may perform these steps. The fourth step is capturing a source image 18 using a camera 42 or acquiring of the source image 18 by the computer 34 by any other means, including harvesting by the computer 34 of the source image 18 from a computer network 50. The source image 18 may be a portrait 44 of a person 46, or of another subject matter that is of subjective relevance to the person 46, or any image. The fifth step is selecting by the computer 34 of a target image region 29 and a region 30 of the matrix of regions 32 to which the source image 18 will correspond. The computer 34 selects the region 30 so that when many source images 18 are displayed on their corresponding regions 30 on the physical matrix of regions 32 the mosaic image 40 of the target image 28 will be displayed.

In the sixth step, if required, the computer 34 may manipulate the source image 18 digitally. The computer 34 may crop the source image 18 or may adjust the color, contrast or intensity of the source image 18 to better match the color, contrast or intensity of the target image region 29 of the target image 28 corresponding to the selected region 30 of the physical matrix of regions 32.

As the seventh and eight steps, the computer 34 will print the manipulated source image 18 to the first area 4 of the printable substrate 2 and will print the physical address 24 of the selected region 30 on the second area 6. The first area 4 is now a tile 20, ready for installation on the matrix of regions 32.

As the ninth step, the person 46 is provided the printable substrate 2. The person 46 is instructed to identify the region 30 on the matrix of regions 32 identified by the physical address 24. The person 46 is also instructed to peel the tile 20 from the backing 14 and to adhere the tile 20 to the matrix of regions 32 at the identified address 24 using the pressure-sensitive adhesive 12 disposed on the back side 10 of the first area 4.

As multiple persons 46 adhere tiles 20 to the matrix of regions 32, the mosaic image 40 emerges.

The following is a list of the numbered elements.
a printable substrate 2
a first area 4
second area 6
front side 8
back side 10
pressure-sensitive adhesive 12
backing 14
release layer 16
source image 18
tile 20
indicia 22
physical address 24
X-Y coordinates 25
cut 26
a target image 28
target image regions 29
physical region 30
matrix of regions 32
computer 34
computer memory 36
mosaic image 40
camera 42
portrait 44
person 46
a printer 48
a computer network 50

We claim:

1. A system for creating a mosaic image, the system comprising:
   a. a physical matrix, the physical matrix defining a plurality of regions, each of the regions having a physical address;
   b. a computer, the computer being configured to divide a target image into a plurality of target image regions, each of the target image regions corresponding to one of the plurality of regions of the physical matrix, the computer having a configuration to receive a source image, the computer being configured to assign the source image to one or more of the target image regions;

c. a printable substrate, the printable substrate having a front side and a back side, the front side of the printable substrate having a first area and a second area, both the first area and the second area being printable, the first area corresponding to a one of the plurality of regions of the physical matrix, the back side of the printable substrate having a pressure sensitive adhesive covered by a backing, the first area having a configuration to be peelable from the backing separately from the second area, the pressure sensitive adhesive being exposed on the back side of the first area when the first area is peeled from the backing;

d. a printer, the printer being configured to print the source image on the first area to define a tile, the printer being configured to print the physical address of the region to which the source image corresponds on the second area, whereby a user may receive the printable substrate from the printer, may identify the address printed on the second area, may identify the physical address on the physical matrix corresponding to the address printed on the second area, may peel the tile from the backing, and may adhere the tile to the physical matrix at the address on the physical matrix corresponding to the address printed on the second area.

2. The system of claim 1 wherein the source image is a one of a plurality of source images, the printable substrate is a one of a plurality of printable substrates and the tile is a one of a plurality of tiles, with each of the plurality of tiles corresponding to one of the regions of the physical matrix, and wherein the plurality of tiles define the mosaic image when each of the plurality of tiles is peeled from the plurality of printable substrates and adhered to the physical matrix at the address corresponding to each of the plurality of tiles.

3. The system of claim 2 wherein the configuration of the first area to be separately peelable from the backing comprises: a cut in the front side of the printable substrate, the cut separating the first area and the second area, the cut not extending through the backing.

4. The system of claim 3 wherein the configuration of the first area to be separately peelable from the backing comprises: a release layer disposed between the pressure sensitive adhesive and the backing of the printable substrate, whereby the first area may be peeled from the backing to expose the pressure sensitive adhesive.

5. The system of claim 2 wherein the configuration of the computer to receive the source image comprises: a camera operably connected to the computer, the camera being configured to capture each of the plurality of source images.

6. The system of claim 2 wherein the configuration of the computer to receive the source image comprises: a computer network connection, the computer being configured to receive the source image over the computer network connection.

7. The system of claim 2 wherein the computer is configured crop the source image or to adjust a color, contrast or intensity of the source image to correspond to the color, contrast or intensity of the region corresponding to the source image.

8. The system of claim 2 wherein the physical address defines an X-Y coordinate.

9. A method of generating a mosaic image comprising the steps of:

a. providing a physical matrix defining a plurality of regions, each of the regions having a physical address;

b. providing a target image and dividing the target image into a plurality of target image regions, each of the target image regions corresponding to one of the plurality of regions of the physical matrix;

c. providing a source image and assigning the source image to one or more of the target image regions;

d. providing a printable substrate, the printable substrate having a front side and a back side, the front side of the printable substrate defining a first area and a second area, both the first and second areas being printable, the first area corresponding to one of the plurality of regions of the physical matrix, the back side of the printable substrate having a pressure sensitive adhesive covered by a backing, the first area having a configuration to be peelable from the backing separately from the second area, the pressure sensitive adhesive being exposed on the back side of the first area when the first area is peeled from the backing;

e. printing the source image on the first area on the front side of the printable substrate to define a tile;

f. printing on the second area on the front side of the printable substrate the physical address of the region corresponding to the source image.

10. The method of claim 9, comprising the additional steps of:

a. providing the printable substrate to a human user;

b. providing instruction to the human user to locate on the physical matrix the physical address printed on the second area;

c. providing instruction to the human user to peel the tile from the backing and to adhere the tile to the physical matrix at the address printed on the second area.

11. The method of claim 10 wherein the printable substrate is one of a plurality of printable substrates, the tile is one of a plurality of tiles and the human user is one of a plurality of human users, wherein the plurality of tiles define the mosaic image when each of the plurality of tiles is peeled from the plurality of printable substrates and adhered to the physical matrix at the physical address printed on the second area of the printable substrate corresponding to each of the plurality of tiles.

12. The method of claim 9 wherein the configuration of the first area to be separately peelable from the backing comprises: a cut in the front side of the printable substrate, the cut separating the first area and the second area, the cut not extending through the backing.

13. The method of claim 12 wherein the configuration of the first area to be separately peelable from the backing further comprises: a release layer disposed between the pressure sensitive adhesive and the backing of the printable substrate, whereby the first area may be peeled from the backing to expose the pressure sensitive adhesive.

14. The method of claim 9 further comprising: providing a computer configured to perform the steps of dividing the target image into the plurality of the target image regions and assigning the source image to one or more of the target image regions.

15. The method of claim 14 further comprising: providing a camera operably connected to the computer, the camera being configured to capture the source image and to provide the source image to the computer.

16. The method of claim 14 further comprising: providing a computer network connection operably connected to the computer, the computer being configured to receive the source image through the computer network connection.

17. The method of claim 14 wherein the computer is configured crop the source image or to adjust a color, contrast or intensity of the source image to correspond to the color, contrast or intensity of the region corresponding to the source image.

18. The method of claim 9 wherein the physical address defines an X-Y coordinate.

\* \* \* \* \*